June 13, 1939.　　　J. J. GREBE　　　2,161,811
SHOCK ABSORBER
Filed June 14, 1937　　　3 Sheets—Sheet 1
FIG. 2.
FIG. 1.
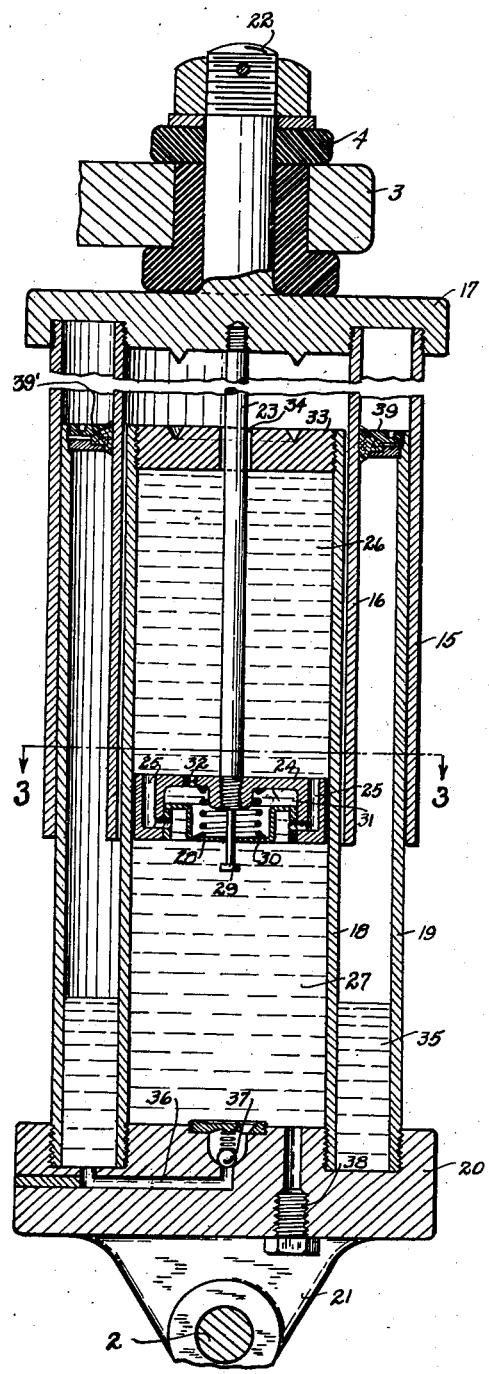
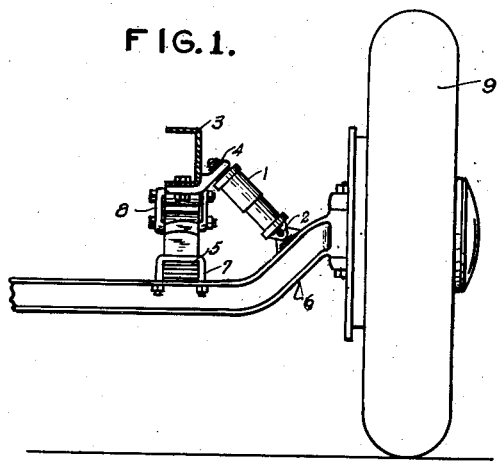
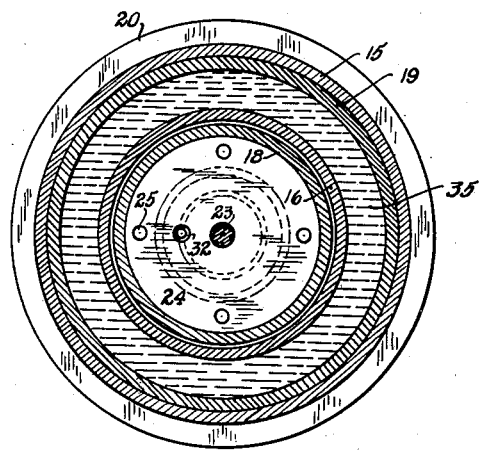
FIG. 3.
INVENTOR.
JOHN J. GREBE
BY
　　ATTORNEY.

June 13, 1939.　　J. J. GREBE　　2,161,811
SHOCK ABSORBER
Filed June 14, 1937　　3 Sheets-Sheet 2

INVENTOR.
JOHN J. GREBE
BY
John H. Leonard,
his ATTORNEY.

June 13, 1939.   J. J. GREBE   2,161,811
SHOCK ABSORBER
Filed June 14, 1937   3 Sheets-Sheet 3

INVENTOR.
JOHN J. GREBE
BY
*John H. Leonard,*
his ATTORNEY.

Patented June 13, 1939

2,161,811

UNITED STATES PATENT OFFICE 2,161,811

SHOCK ABSORBER

John J. Grebe, Midland, Mich.

Application June 14, 1937, Serial No. 147,999

14 Claims. (Cl. 188—88)

This invention relates to an improvement in shock absorbers for use on vehicles and the like and more specifically to a method and means for damping oscillating movements of a resiliently supported vehicle body. It is recognized that many applications, other than as herein disclosed, may be made of this invention for accomplishing a similar result without departing from the real essence of my invention.

It is a principal object of this invention to provide a method and means for damping body oscillations by offering slight resistance to motions of small amplitude and offering more resistance to greater motions.

Heretofore, shock absorber designs have been arranged to offer small resistance when the body and axle of the vehicle are approaching each other, permitting a condition of the body "striking bottom", and greater resistance when they are separating, which at most effectively damp oscillating movements of the body in only one direction.

A recent development in absorber design includes the action of an absorber wherein increased resistance is made as the body and axle move toward or away from each other until such deflection or compression reaches a predetermined amount, whereupon any further movement permits the car body to "strike bottom" by the resistance diminishing considerably below an effective amount.

An objection to the prior designs is that small oscillations of the wheels of the vehicle are restricted and cause more motion of the frame, which condition is particularly dangerous at high speeds since the resistance to these small oscillations tends to hold the wheels from the ground after impact. A further objection is that the prior absorbers are not effectively double acting in that they do not damp axle motion as effectively in one direction as in another, and they allow the frame and body to "strike bottom".

A more specific object of my invention, therefore, is to provide a method and means of damping oscillating movements of a resiliently supported vehicle body by offering slight resistance to road shocks causing relatively small distortions of the resilient support and by offering greater resistance to road shocks causing increased distortions of the support in such a manner that the support damps as much of the road shock as may be done safely and comfortably.

Another object of the present invention is to provide a means which offers only slight resistance to movements of small amplitude but in which the resistance increases proportionately to movements of greater amplitudes beginning at a predetermined minimum amplitude and continues until a predetermined maximum resistance is reached, and maintains the maximum resistance for an appreciable interval and then gradually decreases the resistance as the displacement is reduced to the original position.

Another object is to provide a shock absorber which is substantially inoperative throughout a limited range of small amplitudes but which is increasingly effective in resisting shocks beyond said inoperative range in either direction.

Another object is to provide a shock absorber which will resist shocks in opposite directions respectively by fluid pressure and by the same kind of cycle of operation in each direction, irrespective of the relative starting position of the body and the axle, this being accomplished by a double-acting absorber which operates in each direction to partially relieve the instantaneous fluid pressure during part of the resisting operation and to render the relief of such instantaneous pressure gradually descrescent until a predetermined maximum instantaneous pressure is provided, thereafter maintaining the relief of the instantaneous pressure substantially constant for a predetermined interval, and which absorber effects the same operations in reverse order during return to normal inoperative condition.

Another object of my invention is to damp body and frame oscillations resulting from axle movement by fluid pressure and by a time delay valve means operable by and controlling the fluid pressure, the control being such that the pressure is substantially proportional to displacement of the body frame near its normal or starting position. Graphically speaking, for a given amplitude of motion of the vehicle body, the displacement of the body will follow substantially the contour of a sine curve when plotted against time of displacement. In my invention, the fluid pressure in amount varies substantially as the contour of a sine curve when plotted against the same time intervals except that the pressure curve lags behind the curve of displacement by an amount less than 90°.

A correlative object of this invention is to provide an absorber of the double acting type which builds up resistance to movement by a gradual process, and then maintains resistance during any further movement of the axle or frame, thereby preventing the frame from "striking bottom".

It is a further object of this invention to provide a means which may be incorporated in the many types of absorbers now used, such as the cylindrical or airplane type, the cam type, the vane type, or any other fluid type of absorber which operates by reason of oscillating motion of one object relative to another.

A specific object of this invention is to provide an absorber having a relatively movable member acting against fluid, whereby fluid resistance is developed and including a time delay valve means for relieving fluid resistance so that the operation of the valve is directly dependent upon the amount of movement of the movable member from any starting position.

A further object of this invention is to provide such an absorber which will be practical, efficient, and adaptable for use on present day vehicles.

Several embodiments of the present invention are illustrated. It is to be understood, however, that the large number of embodiments shown as applied to a particular type of vehicle shock absorber does not in any way denote the extent of application of my present invention because innumerable applications of my invention may be made.

Other objects and advantages of the present invention will become apparent from the specification and drawings, in which:

Fig. 1 is an illustration of an assembly of an absorber connected to an axle and to the body frame of an automobile;

Fig. 2 is a sectional view of the absorber and its assembly to the frame and axle as illustrated in Fig. 1;

Fig. 3 is a transverse sectional view taken along the line 3—3 in Fig. 2;

Figure 4:
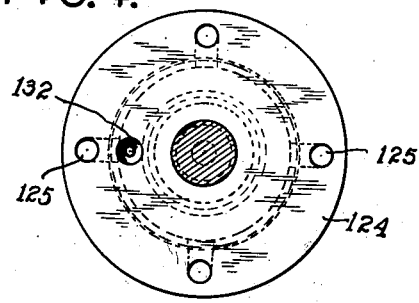
Figs. 4 and 5 are a plan and a sectional view, respectively, of an embodiment of the invention.

Referring to Fig. 1, the ordinary method of mounting a shock absorber is illustrated. The shock absorber 1 is mounted on the axle 6 by a pivotal joint 2 and is resiliently connected to the body frame 3 by a rubber thimble 4. The spring 5 is connected to the axle 6 by suitable shackles 7 and to the frame 3 by shackles 8. The wheel is designated as 9. The mounting of the absorber at an angle to the vertical permits greater possible motion of the axle 6 with respect to the body frame 3 than if the absorber 1 were mounted vertically, but it is to be understood that the present invention is not to be limited to any particular mounting of an absorber to any movable body.

One embodiment of the present invention is illustrated in Figs. 2 and 3 and comprises an adaptation of my invention to the piston type of absorber. A piston type absorber generally comprises cylindrical members 15 and 16 threadably connected to an upper cap 17 and telescoping with two like cylindrical members 18 and 19 which are threadably connected to a lower cap 20, the lower cap 20 having a yoke 21 forming the pivotal joint 2 with the axle 6 of Fig. 1. The threaded projecting stem 22 of the cap 17 along with the rubber thimble 4 provides the resilient mounting of the absorber 1 to the frame 3 of Fig. 1. A piston rod 23 is connected to the upper cap 17. Connected to the rod 23 is a piston 24 which is slidably mounted within the work cylinder 18. Passageways 25 in the piston 24 connect the chambers 26 and 27 above and below the piston, respectively.

Incorporating my invention is a valve 28 slidably mounted on the piston rod 23 by a headed stud 29 which is threadably connected to the rod 23. The valve 28 is held in a normally open position by a spring 30, the extremities of which are affixed to the piston and valve body by welding or like means, such normal position allowing for free flow of the fluid through the passageways from one chamber to the other. Between the valve body 28 and the piston 24 is provided an auxiliary chamber 31 which is connected for the admission and discharge of fluid to the upper chamber 26 by an orifice 32.

The work cylinder 18 at its upper extremity is closed by a cap 33. An opening 34 is provided in the cap for the piston rod 23 which extends therethrough, and the opening is of such diameter as to permit the flow of fluid from the upper chamber 26 to a reservoir 35 by way of a passageway provided by the space between the inside periphery of cylinder 16 and the outside periphery of work cylinder 18. The reservoir 35 is the space provided between the inner periphery of the cylinder 19 and the outer periphery of the work cylinder 18. This reservoir 35 is connected to the lower chamber 27 by means of a passageway 36 in the cap 20 which has interposed therein a check valve 37, the valve preventing the flow of fluid from the chamber to the reservoir directly, and it further permits the flow of fluid to the chamber only during the up-stroke of the piston 24. The removal of fluid may be made by removing the plug 38.

The cylinder 19 has affixed thereto at its upper extremity a gland 89 which retains a ring of flexible material 39' against the outer periphery of the cylinder 16 which, accompanied by the sliding fit between the cylinders 15 and 19, prevents any infiltration of foreign matter.

For operation, the work cylinder 18 is filled with fluid, and a residual amount is placed in the reservoir 35. The piston 24, submerged in the fluid, should be of such dimension that a little leakage of fluid occurs between the outer periphery of the piston and the inner periphery of the working cylinder. The spring 30 normally positions the valve 28, permitting an unrestricted flow of fluid through the passageways 25.

Assuming for purposes of illustration that the wheel 9 in Fig. 1 strikes a bump, such impact would cause the raising of the wheel and the axle 6 upwardly. Due to the action of the car spring 5, the body (not shown) and frame 3 do not move upwardly the same distance as the axle, with the result that the piston 24 is forced downwardly in the working cylinder 18. This produces an excess pressure on the lower face of the piston, which excess or differential pressure, acting against the valve 28, tends to move the valve 28 upwardly and thereby to force the fluid from the auxiliary chamber 31 into the chamber 26. This flow and displacement of fluid in the chamber 31 resists movement of the valve 28 and thus effects a time delay in the operation of the valve. The orifice 32 is preferably of the knife-edge type in order to eliminate substantially the effect of frictional resistance.

It is to be observed that, due to the time delay in action of the valve 28 secured by the fluid control, a limited amount of downward movement of the piston is obtained without any appreciable action of the valve in restricting the flow of fluid through the passageways 25. The amount of movement permitted depends upon the absorber action desired and may be controlled by varying the orifice 32 or the valve openings or otherwise. This condition permits substantially free movement of the piston for small oscillations of the axle and of the body, the oscillations of small amplitude being cared for by the springs 5.

Continued movement or displacement of the piston downwardly, producing an excess or differential pressure acting against the piston, tends to move the valve 28 to a closed position. The closing of the valve is opposed by the fluid in the auxiliary chamber 31, and a complete closing of the valve is not made until sufficient fluid has passed from the auxiliary chamber 31 through the orifice 32 to the working chamber 26. This gradual closing of the valve, which is dependent upon the flow of fluid through the orifice 32, provides a time delay valve action and a gradual decrease of the relief of pressure on the lower side of the piston through the passageways 25. This gradual decrease of relief of pressure is dependent upon the differential pressure or fluid resistance acting on the piston 24 and valve 28 which in turn is dependent upon the amount of movement of the piston in the work cylinder 18 during normal operation in connection with vehicles.

Upon the closing of the passageways 25 by the valve 28, consequent upon further movement of the piston downwardly, the same or greater differential pressure continues to act upon the piston and resist its movement, depending upon the amount of leakage past the piston and the amount of downward movement. It may be advisable, in the absence of leakage, that the valve 30 in its extreme position should not completely close the passageways 25 so that a constant relief of pressure exists. However, this depends upon the conditions desired in the operation of the absorber.

During the downward movement of the piston, it is to be noted that three separate and distinct conditions exist. The instant of impact produces substantially no effect on the valve in restricting the flow of fluid through the passageways. This operation avoids shocks ordinarily transferred to the frame. The impact producing a differential pressure on the working faces of the piston, or a fluid resistance to piston displacement, permits the flow of fluid from the auxiliary chamber 31 to the working chamber 26, but due to the time delay action caused by the time necessary for the fluid to pass through the orifice 32, a gradual decrease in the relief of the differential pressure is secured, this gradual decrease of relief continuing until a maximum of differential pressure is reached and maintained.

This time delay action in the closing of the valve 28 is very effective for avoiding the shocks ordinarily transferred to the frame of the vehicle at the instant of impact, and it is also effective in damping oscillating movement of the frame and body ordinarily resulting from a shock. The continuation of this maximum resistance to motion during continued movement of the piston after the maximum resistance has been maintained provides a cushion for the moving parts and substantially eliminates the "striking bottom" which occurs in many of the present day absorbers.

Upon the return of the piston 24 to its normal position, fluid enters the auxiliary chamber 31 from the working chamber 26 through the orifice 32. During the return movement of the piston back to its normal position, the fluid filling the auxiliary chamber 31 forces the valve 28 back to its open position. A further time delay in valve action is secured during the opening of the valve, which provides a further damping action of oscillations of the frame ordinarily resulting from a shock.

This further time delay is by virtue of the fluid pressure acting against the opposite face of the piston 24 and the work cylinder 26 during the return stroke of the piston, whereupon the fluid pressure is gradually reduced which may be in a manner causing the instantaneous pressure to lag in phase an amount less than 90° behind the displacement of the piston upon its return to starting position. If the oscillation is not substantially damped when the piston reaches its normal or starting position, the piston 24 continues movement in the same direction and again the fluid pressure in the work cylinder 26 lags in phase behind the piston displacement due to the delayed valve action in closing the passageways 25. This cycle of operation is continued until the oscillations are substantially damped and then very little, if any, resistance is offered to the small movements of the piston which occur by reason of small shocks to the axle 6. It is to be understood, however, that this delayed valve action may be modified so that the fluid pressure is gradually increased or decreased with the displacement of the piston 24.

Correspondingly, when the wheel 9 drops into a hole or recess in road surface, the action of the piston is in an upward direction. During the upward stroke of the piston, the fluid enters from the working chamber 26 into the auxiliary chamber 31 through the orifice 32, due to resistance of the fluid to movement of the piston. A certain predetermined movement of the piston occurs before any appreciable action of the valve is made in closing. Further movement produces an increase of resistance and an increase of fluid entering the auxiliary chamber 31, which expansion of the chamber 31 moves the valve towards a closed position. A continued gradual closing is made by continued flow of fluid to the auxiliary chamber. The headed stud 29 prevents any further movement of the valve member 28 beyond the closed position as the piston is moving in the upward direction and any relief of pressure would occur through the opening 34 existing between the cap 33 and the piston rod. Additional leakage may occur past the piston between the inside surface of the cylinder 18 and the outer surface of the piston 24.

Sufficient fluid having entered the auxiliary chamber 31, the valve is moved to its closed or substantially closed position. Any further movement is prevented by the stud 29. The valve remains in this closed position during any further movement of the piston in an upward direction, and relief of pressure may be secured by leakage past the piston, through the opening provided in the cap 33 or through the valve 28.

Figure 11:
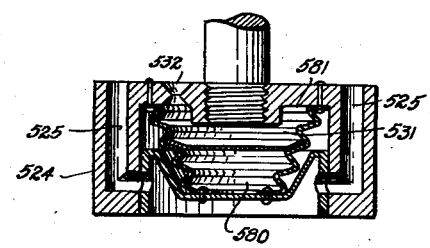

It is to be observed that for a given shock which causes the piston to move upwardly, a short time delay occurs before effecting any substantial operation in movement of the valve 28. This amount of delay may be varied according to the results desired. One manner of decreasing the delay in the valve action is illustrated in Fig. 11, the operation of which will be hereinafter described. A further time delay occurs in moving the valve from an open to a substantially closed position dependent upon the time required for fluid to pass from the working chamber 26 to the auxiliary chamber 31, which again may be varied according to the operation desired of the absorber. The flow of fluid is dependent upon the fluid pressure acting against the upper face of the piston, which fluid pressure is dependent upon the amount of movement of the piston. The valve 28, moved to its closed position by fluid pressure, continues in such position during any further movement of the piston, which condition provides a cushion for the relatively moving parts.

My absorber is effectively a two-way absorber; that is, it performs the same operating and return cycle for either an upward or downward movement of the axle 6 or of the frame 3, and for any given starting position of the frame 3 relative to the axle 6. The time delay action in the operation of the valve, which valve action is dependent upon the fluid resistance produced by movement of the piston, damps very materially the oscillating movement of a spring supported vehicle body developed by the movement of a supporting axle. The initial delay of action, which may be varied in amount depending upon the action desired, in beginning the closing of the valve allows for the unrestricted movement of the piston in the cylinder 18 so that the absorber offers very small resistance to motions of small amplitude, thereby allowing for a limited movement of the spring 5. By substantially or completely closing the valve and maintaining a substantially constant relief, the moving parts are cushioned, and the frame and body, because of such cushioning action, are prevented from "striking bottom". This very detailed explanation of the action of an embodiment of my absorber is made for the purpose of clarity and it is not to be construed as limiting the scope of the invention because of the many variations in operation which may be made.

Further embodiments of the same invention are illustrated in the remaining drawings submitted as part of this application.

In the embodiments of my invention illustrated in Figs. 4 to 12, inclusive, the identity of the principal operating elements with the elements contained in the embodiment shown in Figs. 2 and 3 is made conspicuous by the characters applied and the operation of each embodiment is obvious in view of the detailed description of operation given in connection with Figs. 2 and 3.

Figure 5:
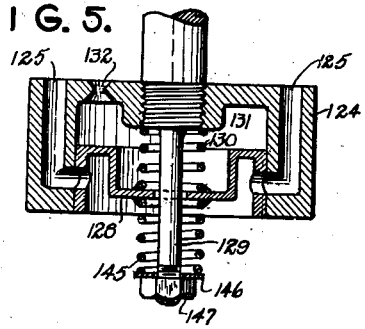

In Figs. 4 and 5, a stud 129 is threaded on its lower end, as compared with stud 29, Fig. 1, in order to allow for the addition of a spring 145. Springs 130 and 145 are for the purpose of positioning a valve 128 in an open position with respect to passageways 125, and this provides an auxiliary chamber 131. The ends of the springs contacting the valve body 128 are fixed thereto by welding or the like in order to compensate for variable resiliency in the springs. The lower end of spring 145 acts against a washer 146 which is held in place by a nut 147 placed on the threaded end of stud 129. An orifice 132 connects the auxiliary chamber 131 with a working chamber, illustrated in Fig. 1 as chamber 18.

Figure 6:
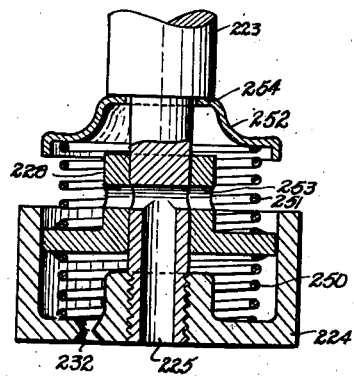

In Fig. 6, an orifice 232 is placed in the lower face of a piston 224. The main passageway 225 is an opening provided in the lower end of a piston rod 223. The valve member 228 has openings 253 cooperating with the passageway 225. The valve itself is positioned by two springs 250 and 251. An end of each spring is affixed to the valve 228. The other end of the spring 251 acts against a shoulder of a cup-shaped member 252, which in turn acts against a shoulder 254 on the rod 223. The other end of the spring 250 acts against an inner surface of the piston 224.

Figure 7:
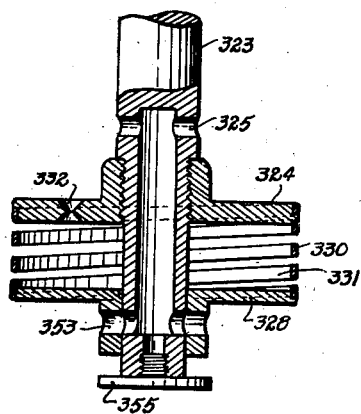
Figs. 6 and 7 are sectional views of other embodiments.

In Fig. 7, the position of the piston 324 and valve 328 on the rod 323 is reversed from that illustrated in Fig. 6. The passageway 325 and valve openings 353 provide a fluid by-pass. The valve 328 is positioned by a single spring 330, which positioning also provides the auxiliary chamber 331, the auxiliary chamber 331 receiving and discharging fluid through orifice 332 to the work cylinder 18, Fig. 1. A threaded cap 355 connected onto the end of piston rod 323 limits the travel of the valve 328.

Figure 8:
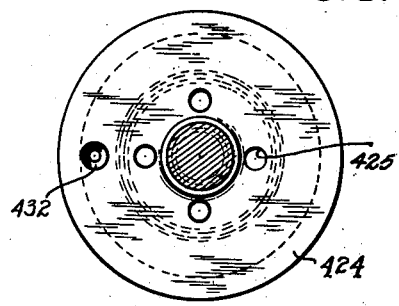
Fig. 8 is a plan view of the embodiment illustrated in Fig. 9.
Figure 9:
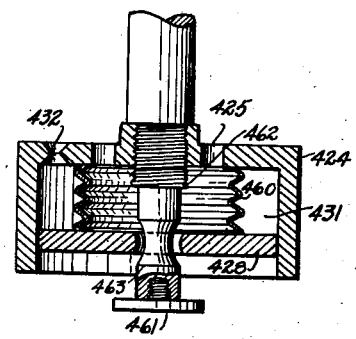
Figs. 9, 10, 11 and 12 are further embodiments of the present invention.

In Figs. 8 and 9, a bellows 460 is cemented or riveted to the piston 424 and valve 428 to form the auxiliary chamber 431. The lower end of the piston rod 423 has connected thereto a seat 463 for valve 428, which controls the flow of fluid through passageways 425. Connected to the valve seat 463 is a stop 461. The amount of travel of the valve 428 is limited by stop 461 and a shoulder 462. The orifice 432 connects the auxiliary chamber 431 defined by the space provided between the piston 424 and the bellows 460 with the work cylinder 18, Fig. 1. The bellows may be made of any suitable material which will be sufficiently flexible as to allow free movement of the valve 428.

Figure 10:
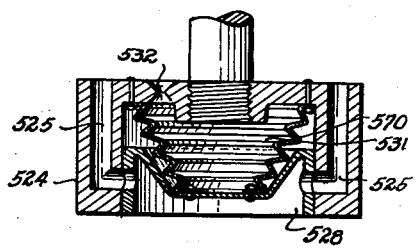

Fig. 10 is similar to the embodiment illustrated in Fig. 2, except that a bellows 570 defines the auxiliary chamber 531 and positions the valve 528 with respect to passageways 525. Orifice 532 in piston 524 is positioned similarly to orifice 32, Fig. 2. The shape of valve 528 gives a more compact structure than valve 28, illustrated in Fig. 2. Bellows 570 is shown connected to piston 524 and valve 528 by riveting.

Fig. 11 is a modification of Fig. 10 in that the auxiliary chamber 531 is partitioned so as to provide a space 580 and space 581, the latter space being connected to work chamber 26, Fig. 1, by orifice 532. The closed space 580 may be filled with any compressible fluid and permits a decrease in the time delay for closing of the valve 528. This decrease in delayed action of the closing of the valve 528 is due to medium in the chamber 580 being of the nature that its property of compressibility causes the valve to close faster upon an application of pressure than if the closed space 580 were filled with fluid, as illustrated in Fig. 10. For a given application of fluid pressure or movement of the piston 524, a greater restriction in the passageways 525 would be produced by the use of a chamber 580 having a compressible medium. Therefore, if it is desired to decrease the delayed action of the valve, an increase in the size of the chamber 580 is made with a corresponding decrease of space 581.

Figure 12:
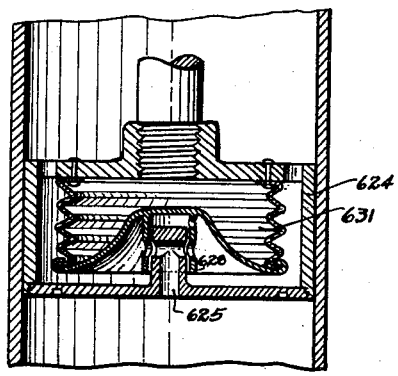

In Fig. 12, the auxiliary chamber 631 is completely isolated from work cylinder 18, Fig. 1, so that no fluid enters or is discharged during movement of piston 624. The chamber 631 may be filled with any suitable compressible medium which will give the delayed action desired so that for a given fluid pressure, a corresponding action of valve 628 will result in controlling the passageways 625.

Many other modifications of the invention are possible. It is believed, however, that the modifications illustrated clearly exemplify my invention, and it is to be understood that I do not choose to be limited in scope except as defined by the appended claims.

Having thus described my invention, I claim:

1. The method of damping oscillations of a resiliently supported member which includes the steps of employing the energy of the member to exert pressure successively on two primary bodies of fluid, employing said pressure to develop pressure on an auxiliary body of fluid, employing said pressure on the auxiliary body of fluid to control discharge of fluid from each primary body through a variable orifice to the other primary body successively, and increasing the constriction of the variable orifice in predetermined relation to variations of volume of said auxiliary body occasioned by the pressure developed in whichever one of said primary bodies is first subjected to pressure, and decreasing the constriction of the orifice in predetermined relation to variations of volume of said auxiliary body occasioned by the pressure developed in the other of said primary bodies which is next subjected to pressure.

2. The method of damping oscillations of a body which includes the steps of employing the energy of the oscillating body to exert pressure successively on two bodies of fluid, employing said pressure to control discharge of fluid successively from each of the bodies of fluid to the other through a variable orifice, increasing the constriction of the variable orifice in a predetermined relation to the variations in pressure in one of said bodies of fluid for effecting a gradual increase of the resisting pressure of the said one of said bodies of fluid, until said resisting pressure reaches a predetermined maximum, and thereafter maintaining said maximum pressure substantially constant during continuance of the displacement, and utilizing the pressure in the other one of said bodies of fluid, upon the movement of the member in the opposite direction and resultant reversal of the flow of said fluid for substantially immediately initiating a gradual decrease of the constriction of the variable orifice.

3. The method of resisting movement of a body capable of movement in opposite directions comprising resisting movement from a fluctuating starting position by fluid whereby fluid resistance is developed, fully relieving the developed fluid resistance during a predetermined material movement of the body in one direction from a fluctuating starting position, rendering relief gradually decrescent during continued body movement in the said one direction until a predetermined maximum resistance is developed, continuing substantially constant relief during further body movement in the said one direction, and rendering relief gradually increasing during movement of the body in the other direction from its position of maximum movement in said one direction, until the body has closely approached its starting position, and then fully relieving the developed fluid resistance.

4. The method of damping oscillating movement of a body developed by displacement of a supporting axle in either of two directions from a fluctuating starting position and the return of said axle from its displaced positions to its starting position, which consists of resisting axle movement during displacement in either direction from its starting position and during return by fluid whereby fluid resistance is developed, relieving resistance during a predetermined displacement from a starting position in a gradually decrescent manner during said displacement until a predetermined maximum resistance is developed, said gradation in relief being dependent upon axle movement, continuing substantially constant relief during any further displacement, and gradually increasing the relief during the return of the axle toward said starting position, from its maximum displaced position.

5. The method of damping oscillating movement of a body developed by its displacement in either of two directions from a starting position and the return of said body to the same starting position, which consists of resisting axle movement during displacement in either direction from the starting position and return to said position by fluid whereby fluid pressure is developed, fully releasing fluid during initial displacement of the body from the starting position for preventing the development of pressure, rendering the release of fluid gradually decrescent during further displacement until a predetermined maximum resistance is developed, and gradually increasing the release of fluid during the return of the body to the position from which it started.

6. In a two-way shock absorber for damping oscillating movement of a body resiliently supported on a support developed by sudden relative displacement of the body and its support in each of two opposite directions from a starting position and the return thereof, means employing fluid for resisting relative movement of the body and to the support both during the displacement in each direction and the return, means for relieving resistance developed during a predetermined relative displacement of the body and support in each of said directions, mechanism for rendering relief gradually decrescent during continued displacement in said directions until a predetermined resistance is developed, means for continuing substantially constant relief during continued displacement, and said mechanism operating to gradually increase the relief during the return of the axle to normal position.

7. In a two-way shock absorber including a body having a chamber, said chamber being substantially filled with fluid, a movable member having a fluctuating equilibrium position in said chamber and resisted in movement from said starting position in each of opposite directions when it is moved in said directions successively by said fluid, means for by-passing fluid around the relatively movable member from the instantaneous pressure side of the member, valve means in said by-passing means for relieving fluid resistance during a predetermined movement of said member, time delay means operated by the pressure of the resisting fluid on said instantaneous pressure side and operating the valve means for rendering the relief of fluid resistance gradually decreasing until a maximum predetermined fluid resistance is developed, means for maintaining substantially constant relief of said fluid resistance after said maximum resistance is developed, and said time delay means, upon return of the member, being operative by fluid pressure developed at the other side of the member for gradually increasing the amount of relief until the member is moved to the equilibrium position.

8. In a two-way shock absorber for damping oscillating movement of a spring supported vehicle body developed by movement of a supporting axle including a body having a chamber, said chamber being substantially filled with fluid, a movable member positioned in equilibrium in said chamber dependent upon the position of the body relative to the axle and resisted in movement by said fluid, means for by-passing fluid around the relatively movable member, a time delay valve means in said by-passing means for relieving any fluid resistance during a predetermined movement of said member and said time delay means rendering the relief of said fluid resistance gradually decreasing until a maximum predetermined fluid resistance is developed, whereupon substantially constant relief of said maximum resistance is continued and rendering an effective cushion for said member during further movement, said time delay means upon reversal of direction of movement of the member gradually increasing the amount of relief until the member is moved to the equilibrium position and said time delay means repeating its cycle of operation upon continued movement of said member in the return direction after passage beyond the equilibrium position.

9. In a two-way shock absorber for damping relative oscillating movement of a body resiliently supported on a support which oscillations are developed by sudden relative displacement of the support and body in each of two opposite directions successively from a starting position and the return thereof from each displaced position and comprising means employing fluid for resisting said relative movement in each of said directions both during the displacement in each direction and the return from displaced position, whereby fluid pressure is developed, by-passing means for relieving the fluid pressure, mechanism operated by the fluid pressure developed by said displacement for rendering the relief gradually decrescent during relative displacement of said body and support until a predetermined resistance is developed, means for continuing substantially constant relief during further displacement in the same direction, and said mechanism being operated by fluid pressure developed by the said first mentioned means upon relative return of the support and body for gradually increasing the relief during the relative return of the support and body to starting position.

10. In a shock absorber for damping relative oscillating movement of a body supported on a support which oscillations are developed by sudden relative displacement of the support and body in a given direction from a starting position and the return thereof, and comprising relatively reciprocable means employing fluid for resisting relative displacement from starting position in said direction and return to said position, whereby fluid pressure is developed, by-passing means for relieving the fluid pressure, one part of said by-passing means being movable with the body, mechanism carried by said part of said by-passing means and operated by the fluid pressure developed by said displacement for rendering the relief through said by-passing means gradually decrescent during relative displacement of said body and support until a predetermined resistance is developed, means for continuing substantially constant relief during further displacement, and said mechanism being operated by fluid pressure developed by said first mentioned means upon relative return of the support for gradually increasing the relief during the return of the support and body to the starting position.

11. In a two-way shock absorber for damping relative oscillating movement of a body resiliently supported on a support which oscillations are developed by sudden relative displacement of the support and body in each of two opposite directions successively from a starting position and the return thereof from each displaced position, and comprising means employing fluid for resisting said relative movement in each of said directions both during the displacement in each direction and the return from displaced position, whereby fluid pressure is developed, by-passing means for relieving the fluid pressure, mechanism operated by the fluid pressure developed by said displacements for rendering relief gradually decrescent during part of the relative displacement of said body and support and until a predetermined resistance is developed, and being substantially inoperative during the initial part of the relative displacement from starting position, means for continuing substantially constant relief during further displacement, and said mechanism operated by fluid pressure developed by the first mentioned means upon relative return of the support and body for gradually increasing the relief during the return of the support and body from displaced position to starting position.

12. The method of damping oscillations of a member from a fluctuating starting position consisting in the steps of resisting movement, successively in opposite directions, of the member by two bodies of fluid which are connectible to and disconnectible from each other through a passage in such manner that the movement of member in each direction develops fluid pressure upon a different one of the bodies of fluid, applying the pressure developed on one of said bodies of fluid by movement of the body in one direction upon an auxiliary body of fluid for varying the volume of the auxiliary body of fluid in accordance with the said developed pressure, reducing the size of the passage in response to variations in the volume of the auxiliary body of fluid for gradually decreasing relief of the developed pressure in the said one of said bodies upon continued movement of the movable member in said one direction until a maximum pressure is developed, and thereafter continuing said relief substantially constant during further movement of the member in the said one direction with resultant continuance of the developed pressure in the said one of the bodies substantially constant, developing pressure upon the other one of said first mentioned bodies of fluid upon movement of the member in the opposite direction, applying said pressure upon the same auxiliary body of fluid for varying the volume thereof in accordance with the pressure developed in the said other one of said bodies of fluid for increasing the size of said passage in response to variations in the volume of the auxiliary body of fluid occasioned by the pressure developed on said second one of the bodies of fluid for gradually increasing the relief of the developed pressure in the said second body of fluid until a maximum relief is developed in said opposite direction.

13. The method of damping oscillations of a member from a fluctuating starting position consisting in the steps of resisting movement, successively in opposite directions of the member by two bodies of fluid which are connectible to and disconnectible from each other through a passage in such manner that the movement of the member in each direction develops fluid pressure upon a different one of the bodies of fluid, applying the pressure developed on one of said bodies of fluid by movement of the body in one direction upon an auxiliary body of fluid, which is continuously connected with one of said bodies, for varying the volume of the auxiliary body of fluid in accordance with the said developed pressure, reducing the size of the passage in response to variations in the volume of the auxiliary body of fluid for gradually decreasing relief of the developed pressure in the said one of said bodies upon continued movement of the movable member in said one direction until a maximum pressure is developed, and thereafter continuing said relief substantially constant during further movement of the member in the said one direction with resultant continuance of the developed pressure in the said one of the bodies substantially constant, developing pressure upon the other one of said first mentioned bodies of fluid upon movement of the member in the opposite direction, applying said pressure upon the same auxiliary body of fluid for varying the volume thereof in accordance with the pressure developed in the said other one of said bodies of fluid for increasing the size of said passage in response to variations in the volume of the auxiliary body of fluid occasioned by the pressure developed on said second one of the bodies of fluid for gradually increasing the relief of the developed pressure in the said second body of fluid until a maximum relief is developed in said opposite direction.

14. The method of damping oscillations of an oscillating member in each direction and return from a fluctuating starting position consisting in the steps of resisting movement, successively in opposite directions, of the member by two bodies of fluid which are connectible to and disconnectible from each other through a passage in such manner that the movement of the member in each direction develops fluid pressure upon a different one of the bodies of fluid, applying the pressure developed on one of said bodies of fluid by movement of the body in one direction upon an auxiliary body of fluid for varying the volume of the auxiliary body of fluid in accordance with the said developed pressure, reducing the size of the passage in response to variations in the volume of the auxiliary body of fluid for gradually decreasing relief of the developed pressure in the said one of said bodies upon continued movement of the movable member in said one direction until a maximum pressure is developed, thereafter continuing said relief substantially constant during further movement of the member in the said one direction with resultant continuance of the developed pressure in the said one of the bodies substantially constant, developing pressure upon the other one of said first mentioned bodies of fluid upon movement of the member in the opposite direction, applying said pressure upon the same auxiliary body of fluid for varying the volume thereof in accordance with the pressure developed in the said other one of said bodies of fluid for increasing the size of said passage in response to variations in the volume of the auxiliary body of fluid occasioned by the pressure developed on said second one of the bodies of fluid for gradually increasing the relief of the developed pressure in the said second body of fluid until a maximum relief is developed in said opposite direction, and then repeating said steps, in the same order, upon movement of the member in the opposite direction from the starting position and return thereof.

JOHN J. GREBE.